(12) United States Patent
Girardeau, Jr.

(10) Patent No.: US 6,341,148 B1
(45) Date of Patent: Jan. 22, 2002

(54) METHOD AND APPARATUS FOR MINIMIZING TRANSIENT SAMPLING FLUCTUATIONS UPON TRANSITION BETWEEN MODES OF COMMUNICATION

(75) Inventor: James Ward Girardeau, Jr., Sacramento, CA (US)

(73) Assignee: Level One Communications, Inc., Sacramento, CA (US)

(*) Notice: Subject to any disclaimer, the term of this patent is extended or adjusted under 35 U.S.C. 154(b) by 0 days.

(21) Appl. No.: 09/185,889

(22) Filed: Nov. 4, 1998

(51) Int. Cl.[7] ................................................. H04L 7/00
(52) U.S. Cl. ........................ 375/355; 375/354; 375/357; 375/371; 327/2; 370/916
(58) Field of Search ............................... 375/219, 354, 375/355, 214, 326, 322, 324, 357, 371, 376; 455/553; 327/2, 5, 16, 17; 370/282, 916

(56) References Cited

U.S. PATENT DOCUMENTS

| | | | | |
|---|---|---|---|---|
| 5,513,209 A | | 4/1996 | Holm | |
| 5,703,904 A | * | 12/1997 | Langberg | ................ 375/232 |
| 6,018,556 A | * | 1/2000 | Janesch et al. | ............. 375/376 |
| 6,115,431 A | * | 9/2000 | Lee | ............................. 375/324 |
| 6,134,276 A | * | 10/2000 | Aman et al. | ................ 375/326 |
| 6,192,088 B1 | * | 2/2001 | Aman et al. | ................ 375/326 |
| 6,198,780 B1 | * | 3/2001 | Kang | ......................... 375/321 |

\* cited by examiner

*Primary Examiner*—Chi Pham
*Assistant Examiner*—Dung X. Nguyen
(74) *Attorney, Agent, or Firm*—Merchant & Gould P.C.

(57) ABSTRACT

The present invention provides a transceiver which does not lose synchronization upon a transition from a non-precoded communication mode to a precoded communication mode and minimizes phase drift. A transceiver unit outputs a signal representing the phase of a received signal, and that possesses a controllable sampling rate. The transceiver is coupled to a phase reference selector and a timing control system. Upon a transition between communication modes, an adaptation period is initiated. The phase reference selector captures the phase estimate immediately prior to termination of the adaptation period, outputting a predetermined phase reference until such termination, at which point the stored phase estimate is outputted. The timing control system minimizes the difference between the phase estimate and the output of the phase reference selector by altering the sampling rate, except during the adaptation period, during which the sampling rate is held constant.

11 Claims, 3 Drawing Sheets

METHOD AND APPARATUS FOR MINIMIZING TRANSIENT SAMPLING FLUCTUATIONS UPON TRANSITION BETWEEN MODES OF COMMUNICATION

BACKGROUND OF THE INVENTION

1. Field of the Invention

This invention relates in general to a timing recovery device for a precoded communication system, and more particularly to a synchronization system that minimizes transient sampling fluctuations upon transition between modes of communication.

2. Description of Related Art

The telephone networks currently in place were originally designed for transmission of electrical signals carrying human speech. Since human speech is generally confined within a band ranging from 0 Hertz to 3,400 Hertz, telephone networks were designed to provide telephone lines to each user which were capable of handling frequencies within this range. Today, these same telephone lines, which connect a service user to a central office, are in place, permitting communication of only voice data or analog modem transmissions of not more than 56,000 bits per second. However, connections between central offices of telephone networks are provided by high-bandwidth fiber optic transmission facilities in nearly every telephone network worldwide.

Because the local telephone lines which connect an end user to a central office are only capable of handling frequencies of up to 3,400 Hertz, communication equipment utilizing these lines, such as dial modems or fax modems, have been accordingly limited in bandwidth. Despite the presence of high bandwidth fiber optic lines between central offices, users remain limited in the bandwidth available to them because the local lines serve as a bottleneck. New technologies, such as the Internet or video conferencing, demand that the bottleneck be removed.

Digital Subscriber Line (DSL) technologies are capable of removing the bottleneck. DSL permits a user to communicate over the existing telephone lines at a rate of tens of millions of bits per second. In order to utilize DSL, a site must be equipped with a transceiver (a DSL modem) which communicates, via the existing telephone lines, with another transceiver located at the central office of the network access provider, generally the local telephone company.

As already stated, DSL transceivers are designed to operate at high data rates. One difficulty encountered by DSL transceivers is intersymbol interference. Intersymbol interference is the superposition of a residual portion of a previous waveform over a present waveform. Such an event causes the present waveform to be increased in amplitude by the residual portion of the previous waveform, and may cause the present waveform to be misinterpreted by the receiving transceiver. Intersymbol interference is due, in part, to the high data rate of DSL transceivers.

One means of dealing with intersymbol interference is to implement a system of precoding. In general, precoding refers to various techniques of distorting a signal to be transmitted in order counteract the anticipated distortional effects of the medium across which the signal is to travel. Before a signal may be precoded, the medium across which it will propagate must be characterized. In the case of DSL transceivers that implement precoding, the local telephone lines connecting the service user and the network access provider must be characterized.

During the characterization process, DSL transceivers communicate in a non-precoded mode. In other words, until the characteristics of the medium are determined, the waveforms to be transmitted cannot be pre-distorted in anticipation of the effects of the medium.

In either precoded or non-precoded mode, communication between DSL transceivers is synchronous. Synchronization between transceivers is accomplished by a timing recovery circuit that adjusts the transceiver's sampling based on the pulse shape of the data to be received. Upon a transition from non-precoded to precoded communication (which occurs after the medium has been characterized), the timing pulse may suddenly change shape, as it will henceforth be pre-distorted by the transmitting transceiver. This change in shape can have a disruptive influence on the timing recovery circuit, causing both a transient in timing and a permanent phase movement. The permanent phase movement can cause a performance degradation because the precoded system was trained on the previous phase.

It can be seen that there is a need for an invention which minimizes the chance of losing synchronization when switching from non-precoded to precoded mode.

It can also be seen that there is a need for an invention which minimizes or eliminates both the transient effect and the permanent timing phase movement that results from a sudden change in shape of the timing pulse.

SUMMARY OF THE INVENTION

To overcome the limitations in the prior art described above, and to overcome other limitations that will become apparent upon reading and understanding the present specifications, the present invention discloses a synchronization system that minimizes transient and permanent sampling fluctuations upon transition between non-precoded communication to precoded communication.

The present invention solves the above-described problems by providing a system that minimizes the transient effect and permanent phase movement associated with a transition between modes of communication. Such a system minimizes the chance of losing synchronization when switching from a non-precoded mode to a precoded mode of communication, and prevents a phase movement from causing a degradation in performance in precoder mode.

A system in accordance with the principles of the present invention includes a transceiver unit with a digital front end, the sampling of which is controlled by a timing recovery system. Such a timing recovery system alters the sampling rate of the front end of the transceiver based upon a process of minimizing the difference between an estimate of the current phase of the received signal and a phase reference. Upon transition between communication modes, an adaptation period is initiated, during which the sampling rate is held constant. Upon expiration of the adaptation period, the phase reference is changed to be an estimate of the phase of the received signal just prior to expiration of the adaptation period.

Other embodiments of a system in accordance with the principles of the invention may include alternative or optional additional aspects. One such aspect of the present invention is that the timing recovery system may be constructed of a phase reference selector and a timing control system. The phase reference selector captures the phase estimate immediately prior to termination of the adaptation period, outputting a predetermined phase reference until such termination, at which point the stored phase estimate is outputted. The timing control system minimizes the difference between the phase estimate and the output of the phase reference selector by altering the sampling rate, except during the adaptation period, during which the sampling rate is held constant.

Another aspect of the present invention is that the phase reference selector may be constructed of a multiplexer and a register. The register captures the phase estimate immediately prior to termination of the adaptation period. The multiplexer selects, as its output, a first predetermined phase reference value until the expiration of the adaptation period, at which time the value in the register is selected.

Another aspect of the present invention is that the timing control system may be constructed from a feedback circuit and an adder. The adder produces an error signal by calculating the difference between the selected phase reference and the current phase estimate. The feedback circuit minimizes the error signal by adjusting the sampling rate, except during the adaptation period when the sampling rate is held constant.

These and various other advantages and features of novelty which characterize the invention are pointed out with particularity in the claims annexed hereto and form a part hereof. However, for a better understanding of the invention, its advantages, and the objects attained by its use, reference should be made to the drawings which form a further part hereof, and to the accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a mechanism for minimizing transient fluctuation of sampling rates for a transceiver in the aftermath of a transition between communication modes.

Figure 1:
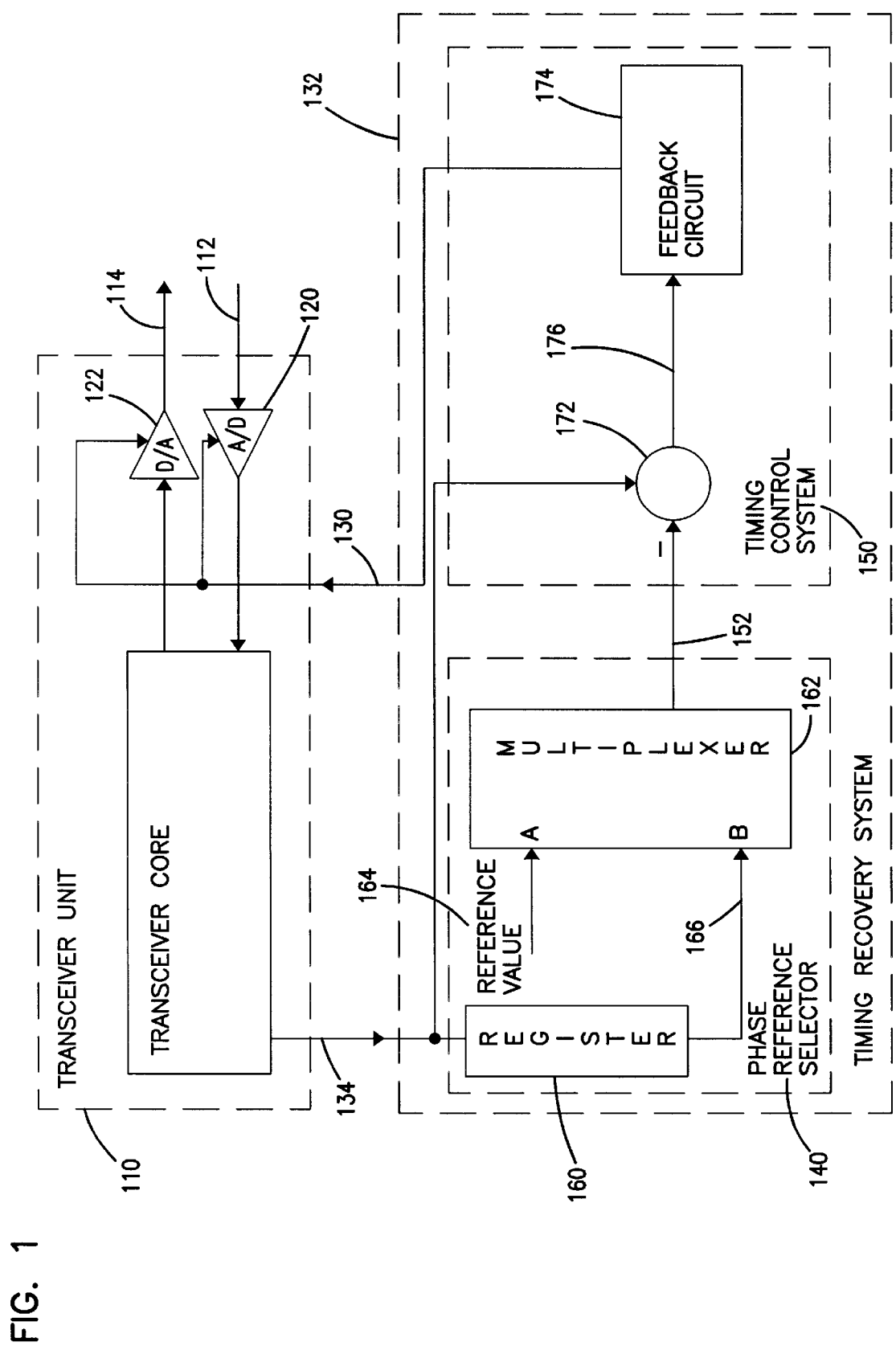
FIG. 1 illustrates a transceiver system embodying the invention.

FIG. 1 illustrates a transceiver system according to the present invention. In FIG. 1 a transceiver unit 110 communicates synchronously, whether operating in precoded or non-precoded mode via input 112 and output 114 ports. Transceiver unit 110 possesses a receiving 120 and transmitting 122 digital front end that samples and quantizes the signals. Since the transceiver unit 110 communicates synchronously, the receiving 120 and transmitting 120 digital front end must sample the signals at the appropriate time, otherwise the data will be misinterpreted. The timing of the sampling is controlled by the sampling rate control signal 130.

The sampling rate control signal 130 is generated by the timing recovery system 132. The timing recovery system 132 generates the sampling rate control signal 130 based upon a phase estimate signal 134. The phase estimate signal 134 is a signal that represents the phase of the received signal. Ideally, the phase between the received signal and the sampling cycle should be zero degrees.

The phase between the received signal and the desired sampling point is determined by sampling the received signal. If such a signal is sampled, the level of the sample will be related to the timing of the sampling. For instance, if a saw-tooth wave is sampled early in its cycle, the level of the sample will be lower than if it had been sampled later in its cycle. Thus, by sampling the received signal, and comparing the level of the sample to a reference level indicative of perfect synchronization, or zero phase shift, the phase of the received signal with respect to the sampling point may be determined, and the circuit 100 locks to the pulse shape of the received data using the data itself as a timing reference. Accordingly, one way for the phase estimate signal 134 to provide information regarding the phase of received signal is for it to represent the level of the sample of the timing pulse.

In non-precoded mode, the timing recovery system 132 functions by comparing the phase estimate signal 134 against a reference level indicative of perfect synchronization in non-precoded mode, and minimizing the difference between the two levels by continuously adjusting the sampling rate control signal 130.

If the timing recovery system 132 were to continue operating in the same manner after a transition to precoded mode, both a transient and permanent timing shift could occur, because the phase reference level appropriate for non-precoded mode does not account for the additive distortion included in precoded signals. To solve this problem, the timing recovery system 132 holds the frequency of the sampling rate control signal 130 constant at the time of transition between non-precoded mode to precoded mode. That action is based upon the premise that the sampling cycle and the received signal are in phase at the time of transition, because the timing recovery system 132 had been minimizing their phase difference continuously during non-precoded communication.

The condition of invariant sampling frequency is allowed to persist for the duration of an adaptation period. Upon expiration of the adaptation period, it is assumed that the sampling cycle and the received signal continue to be synchronized. Accordingly, the phase estimate signal 134 is indicative of synchronization and may henceforth be used as a phase reference level for precoded mode.

After termination of the adaptation period, the timing recovery system 132 compares the phase estimate signal 134 against the new reference level, i.e., the phase estimate signal prevailing just prior to expiration of the adaptation period. Then, the sampling rate control signal 130 is once again continuously adjusted in order to minimize the difference between the two levels.

As shown in FIG. 1, the timing recovery system includes a phase reference selector 140 and a timing control system 150. In this example, the phase reference selector 140 begins operation by selecting the pre-determined non-precoded phase reference signal 152 for output. At a time just prior to the expiration of the adaptation period, the phase reference selector 140 captures the current phase estimate signal 134. Upon expiration of the adaptation period, the captured phase estimate signal 134 is outputted as the precoded phase reference signal 152.

Working in conjunction with the phase reference selector 140 is the timing control system 150, which minimizes the difference between the output of the phase reference selector 140 and the phase estimate signal 152 by adjusting the sampling rate control signal 130. The timing control system 150 suspends this process, holding the frequency of the sampling rate control signal 130 constant during a duration beginning at transition between communication modes and ending when the adaptation period expires.

One example of a phase reference selector 140 that operates, as described in the previous example, is shown in FIG. 1, wherein the phase reference selector 140 includes a register 160 and a multiplexer 162. In this example, the multiplexer 162 selects one of its two inputs 164, 166 for output. During the course of non-precoded communication, the pre-determined, non-precoded phase reference signal 164 is selected as the appropriate phase reference signal 152. At a time just prior to the expiration of the adaptation period, the register 160 captures the current phase estimate signal 134, and provides this signal as the second input 166 to the multiplexer 162. Upon expiration of the adaptation period, the second input 166 is selected for output as the appropriate phase reference signal 152.

One example of a timing control system 150 that operates in conjunction with the phase reference selector 140 described in the previous example, is shown in FIG. 1, wherein the timing control system 150 includes an adder 172 and a feedback circuit 174. In this example, the adder 172 calculates the difference between phase estimate signal 134 and the selected phase reference signal 152, producing a phase error signal 176. The phase error signal 176 is minimized by the feedback circuit 174, which adjusts the sampling rate control signal 130 in so doing. The operation of the feedback circuit 174 is suspended throughout a duration beginning at the transition between communication modes and ending when the adaptation period expires, during which the sampling rate control signal 130 is held at a constant frequency irrespective of the phase error signal 176. Upon expiration of the adaptation period, the feedback circuit resumes normal operation, minimizing the phase error signal 176 by adjusting the sampling rate control signal 130.

Figure 2:
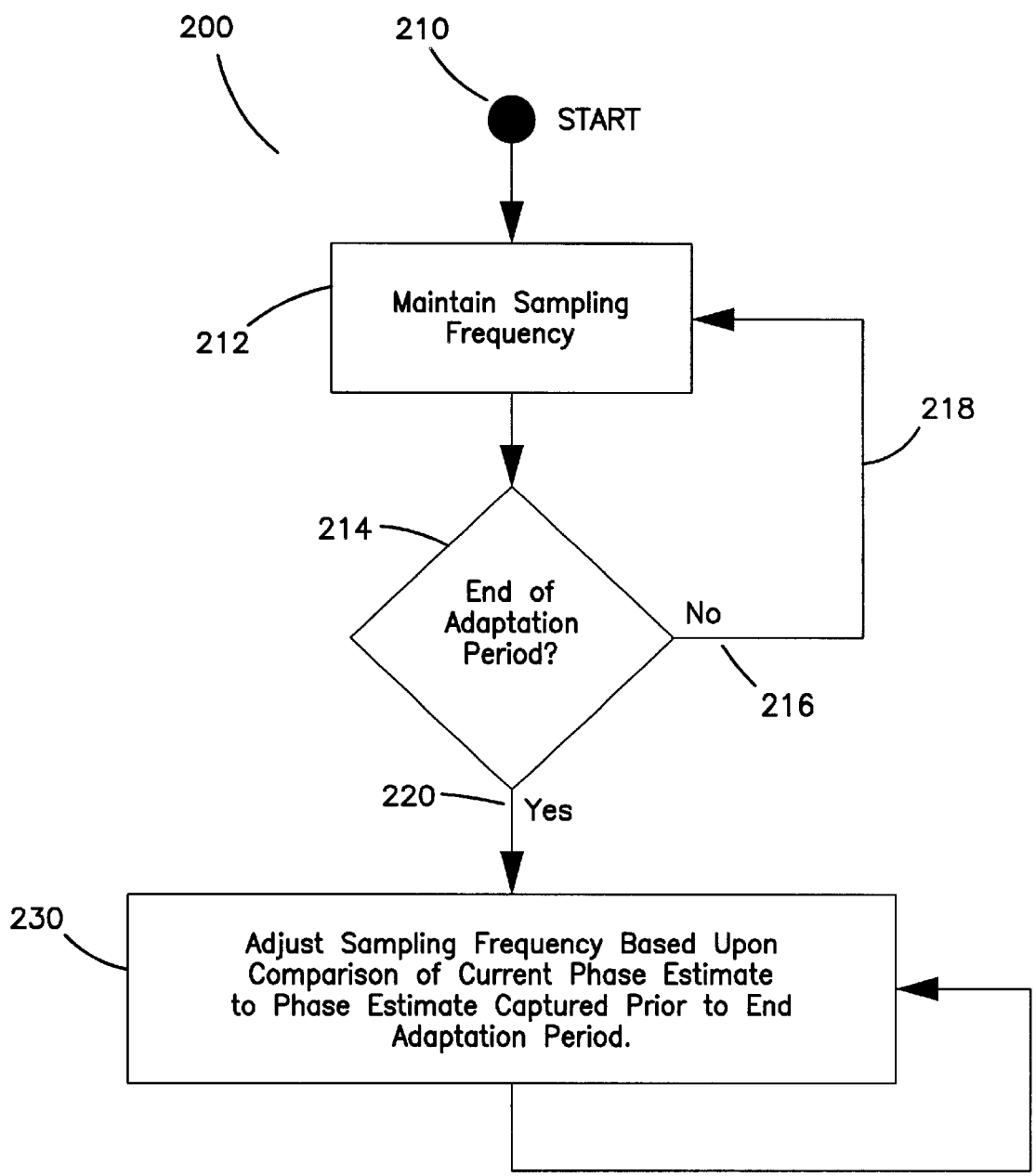
FIG. 2 illustrates a method of minimizing transient fluctuation of sampling rates in a transceiver, resulting from a transition between communication modes.

Regardless of the embodying structure, the invention operates according to a method for minimizing fluctuation of sampling rates 200 as shown in FIG. 2. The entrance point 210 of the chart signifies a transition between communication modes. As can be seen, immediately thereafter, the sampling frequency is held constant 212. Then, whether the end of the adaptation period occurs is determined 214. If not 216, the method loops back 218 to maintain the frequency. At the end of the adaptation period 220, the sampling frequency is continuously adjusted based upon a comparison of the current phase estimate to the phase estimate captured prior to termination of the adaptation period 230.

Figure 3:
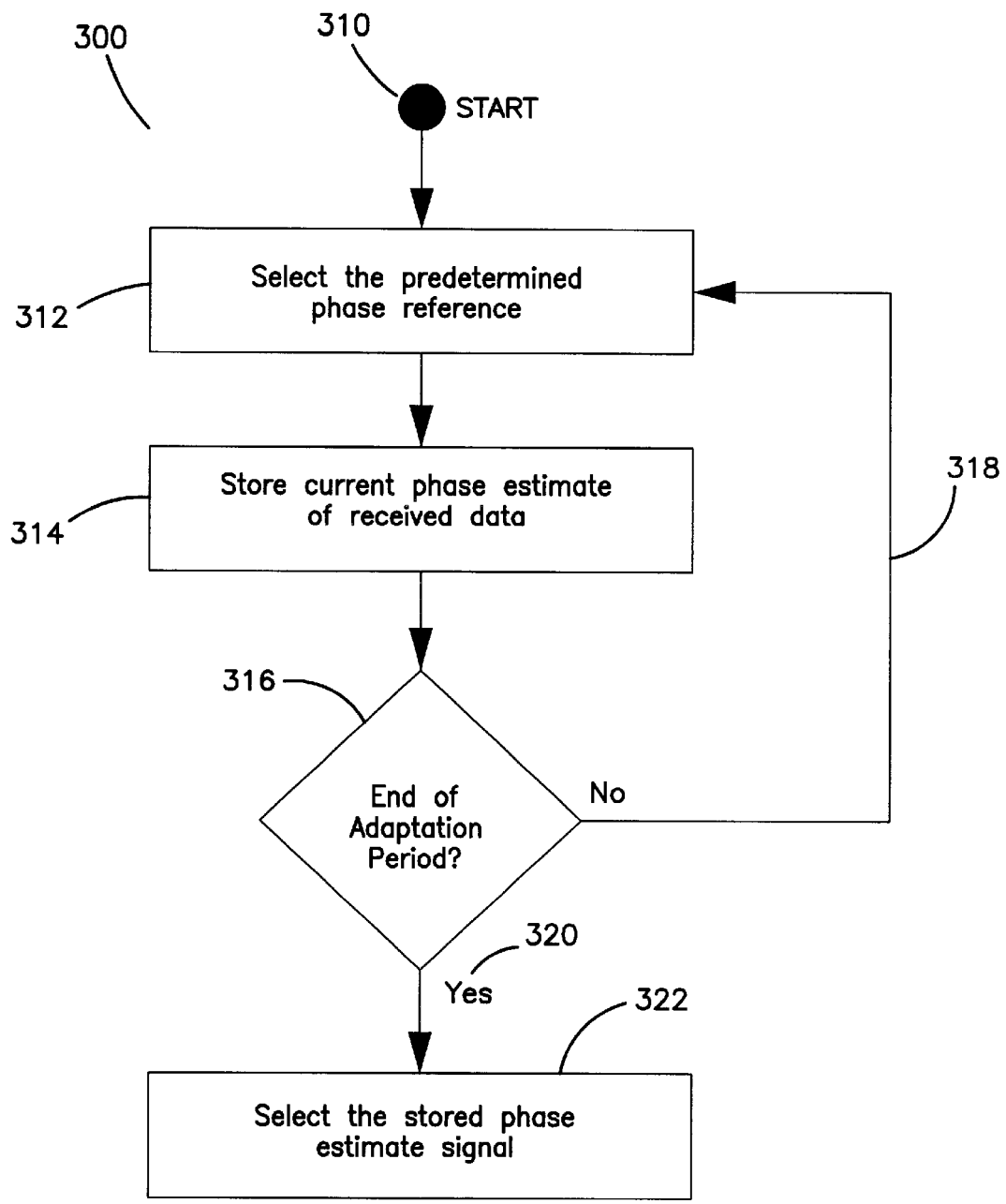
FIG. 3 illustrates a method of selecting a phase reference signal.

The appropriate phase reference signal is selected as illustrated by FIG. 3. As can be seen, upon initiation of communication 310, a predetermined phase reference is selected 312. Each time a new phase estimate is calculated, it is stored for potential use as a new phase reference 314. The end of the adaptation period is determined 316 and the cycle continues 318 until termination of the adaptation period 320. Upon termination of the adaptation period 320, the last stored phase estimate is selected as the new phase reference 322.

The foregoing description of the exemplary embodiment of the invention has been presented for purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A transceiver system comprising:

a transceiver unit providing a phase estimate signal and receiving a sampling rate control signal that controls the sampling rate of the transceiver; and a timing recovery system, coupled to the transceiver, adjusting, after an adaptation period following a transition between communication modes, a phase reference signal which is selected to remain the same during the transition between communication modes, based upon the phase estimate signal, to modify the sampling rate control signal, the sampling rate control signal being held at a constant frequency throughout a duration beginning at the transition between the communication modes and ending when the adaptation period expires.

2. The transceiver system as claimed in claim 1, wherein the timing recovery system comprises:

a phase reference selector for capturing the phase estimate signal which immediately precedes termination of the adaptation period, and selecting, as an output, a predetermined phase reference signal until the termination of the adaptation period, at which time the captured phase estimate signal is selected; and a timing control system, coupled to the phase reference selector, for minimizing the difference between the phase estimate signal and the signal provided by the phase reference selector by varying the frequency of the sampling rate control signal, which becomes invariant upon a transition between communication modes, and remains invariant until the expiration of the adaptation period.

3. The transceiver system as claimed in claim 2, wherein the phase reference selector comprises:

a multiplexer providing a phase reference signal as an output, receiving a first input signal representing a reference value, and receiving a second input signal, the multiplexer selecting the first input signal until the termination of the adaptation period, at which time the second input signal is selected; and a register, coupled to the second input of the multiplexer, for capturing the phase estimate signal immediately prior to termination of the adaptation period.

4. The transceiver system as claimed in claim 2, wherein the timing control system comprises:

a feedback circuit for minimizing a phase error signal by adjusting the frequency of the sampling rate control signal, the sampling rate control signal becoming invariant upon transition between communication modes, and remaining invariant until the expiration of the adaptation period; and an adder, coupled to the feedback circuit, for providing the phase error signal for the feedback circuit by calculating the difference between the phase estimate signal and the signal provided by the phase reference selector.

5. A phase reference selector for capturing a phase estimate signal immediately preceding termination of an adaptation period, the phase reference selector selecting as an output a stored phase reference signal until the termination of an adaptation period, at which time the captured phase estimate signal is selected.

6. The phase reference selector of claim 5, wherein the phase reference selector comprises:

a multiplexer for providing a phase reference signal as an output, receiving a first input signal representing a reference value, and receiving a second input signal, the multiplexer selecting the first input signal until the termination of the adaptation period, at which time the second input signal is selected; and a register, coupled to the second input of the multiplexer, for capturing the phase estimate signal immediately prior to termination of the adaptation period.

7. A timing control system for minimizing the difference between a phase estimate signal and a phase reference signal, the timing control system varying the frequency of a sampling rate control signal, the sampling rate control signal becoming invariant upon transition between communication modes and remaining invariant until the expiration of the adaptation period.

8. The timing control system of claim 7, wherein the timing control system comprises:

a feedback circuit for minimizing a phase error signal by adjusting the frequency of the sampling rate control signal, which becomes invariant upon transition between communication modes, and remains invariant until the expiration of the adaptation period; and an adder, coupled to the feedback circuit, for providing the phase error signal for the feedback circuit by calculating the difference between the phase estimate signal and the phase reference signal.

9. A transceiver unit comprising:

a transceiver core that receives digitized reception data, provides digital data for transmission, and provides a signal representative of the phase estimate of the digitized reception data;

a digital-to-analog converter, coupled to the transceiver core, for converting the digital data for transmission from the transceiver core to analog data for transmission;

an analog-to-digital converter, coupled to the transceiver core, for converting analog reception data to digital reception data for the transceiver core; and a timing recovery system, coupled to the transceiver core, for adjusting, upon transition between communication modes, a phase reference signal based upon the representative phase estimate signal, the timing recovery system continuously adjusting the sampling rate control signal, the sampling rate control signal being provided to the analog-to-digital converter and the digital-to-analog converter for control the sampling rate of the analog to digital-to-analog converter.

10. A method of minimizing transient fluctuation of sampling rates for a transceiver, which result from a transition between communication modes, comprising:

maintaining, until expiration of an adaptation period, the sampling frequency prevailing just prior to transition between communication modes; and upon expiration of the adaptation period, continuously adjusting the sampling frequency so as to minimize the difference between present phase information and phase information from a time preceding expiration of the adaptation period.

11. A method of selecting a phase reference comprising:

selecting a predetermined phase reference prior to the expiration of an adaptation period, said phase reference signal which is selected to remain the same during the transition between communication modes;

storing the phase of data received prior to the expiration of the adaptation period; and upon expiration of the adaptation period, selecting the stored phase data to be used as a phase reference.

* * * * *